United States Patent [19]
Sumpter et al.

[11] Patent Number: 5,132,385
[45] Date of Patent: Jul. 21, 1992

[54] ONE PART HEAT CURABLE ORGANOPOLYSILOXANE COMPOSITIONS

[75] Inventors: Chris A. Sumpter; Larry N. Lewis, both of Scotia, N.Y.; Kevin X. Lettko, Amherst, Mass.; Mark W. Davis, Clifton Park, N.Y.

[73] Assignee: General Electric Company, Schenectady, N.Y.

[21] Appl. No.: 769,273

[22] Filed: Oct. 1, 1991

Related U.S. Application Data

[63] Continuation-in-part of Ser. No. 627,478, Dec. 14, 1990, Pat. No. 5,106,939.

[51] Int. Cl.$^5$ .............................................. C08G 77/06
[52] U.S. Cl. ....................... 528/15; 528/31; 528/32; 525/478
[58] Field of Search ...................... 528/15, 31, 32; 525/478

[56] References Cited

U.S. PATENT DOCUMENTS

| | | | |
|---|---|---|---|
| 4,990,560 | 2/1991 | Ikeno et al. ........................ | 524/731 |
| 5,015,691 | 5/1991 | Lewis et al. ........................ | 525/100 |
| 5,025,073 | 6/1991 | Lewis et al. ........................ | 528/15 |

OTHER PUBLICATIONS

Reactions of (n-1,5-cyclooctadiene) Organopolatinum (II) Compounds and the Synthesis of Perfluoroalkyl-platinum Complexes, H. C. Clark and L. E. Manzer-Journal of Organometallic Chem. 59 (1973), pp. 411-428.

Preparation and Properties of Inclusion Compounds of Transition Metal Complexes of Cyclo-ocata-1,5-diene and Norbornadiene with Cyclodextrins, A. Harada, et al. Journal of The Chemical Society, No. 16 (1986), pp. 1229, 1230.

Primary Examiner—Melvyn I. Marquis
Assistant Examiner—M. W. Glass
Attorney, Agent, or Firm—James E. McGinness; James C. Davis, Jr.; James Magee, Jr.

[57] ABSTRACT

Shelf stable heat curable mixtures of vinyl substituted organopolysiloxane fluid and siloxane hydride are provided. The one part polyorganosiloxane mixtures are catalyzed with an inclusion compound of a cyclodextrin and a complexing ligand such as, cyclopentadiene, 1,5-cyclooctadiene or norbornadiene and a platinum metal material, such as a $C_{(1-4)}$ alkyl substituted platinum.

9 Claims, No Drawings

ONE PART HEAT CURABLE ORGANOPOLYSILOXANE COMPOSITIONS

CROSS REFERENCE TO RELATED APPLICATIONS

This application is a continuation in part of copending application Ser. No. 07/627,478 filed Dec. 14, 1990 now U.S. Pat. No. 5,106,939. Reference also is made to copending application Ser. No. 424,022, filed Oct. 19, 1989 and now U.S. Pat. No. 5,025,073, and assigned to the same assignee as the present invention relating to One Part Heat Curable Organopolysiloxane Compositions.

BACKGROUND OF THE INVENTION

The present invention relates to one part heat curable organopolysiloxane compositions having improved shelf stability. More particularly, the present invention relates to the employment of a hydrosilylation catalyst in the form of an inclusion compound of a cyclodextrin, such as β-cyclodextrin and a platinum complex free of platinum halogen bonds, such as a complex of platinum metal, or platinum metal substituted with up to three $C_{(1-4)}$ alkyl radicals and in further combination with a complexing ligand such as cyclopentadiene, a 1,5-cyclooctadiene or a norbornadiene.

Prior to the present invention, as shown by Kookootsedes et al, U.S. Pat. No. 3,445,420, one component organopolysiloxane compositions were based on a platinum catalyzed silicon hydride-silicon vinyl addition reaction which generally utilized an inhibitor for the platinum catalyst. The purpose of the inhibitor was to slow down the hydrosilylation reaction to increase the work life of the one component organopolysiloxane mixture at low or room temperatures. The organopolysiloxane mixtures were generally composed of a base polymer consisting of a polydiorganosiloxane having chemically combined methylvinylsiloxy units which was used in combination with a silicon hydride siloxane. Additional inhibited one package silicon hydride-silicon vinyl platinum addition curable organopolysiloxane compositions are shown by Berger et al, U.S. Pat. No. 3,882,083, utilizing an ethylenically unsaturated isocyanurate as an inhibitor, and U.S. Pat. Nos. 4,472,562 and 4,472,563 employing acetylenic unsaturated inhibitors.

In copending application Ser. No. 07/354,557, filed May 22, 1989, now U.S. Pat. No. 5,015,691, one part heat curable organopolysiloxane compositions are described utilizing a platinum catalyst which is microencapsulated in an organic resin, such as a thermoplastic organic polymer, or a thermosetting organic polymer. The microencapsulated catalyst is in the form of capsules having an average diameter of about 4-60 microns. Although satisfactory shelf stability under ambient conditions can be achieved with the use of such microencapsulated platinum catalysts in one part mixtures of a vinyl-substituted polydiorganosiloxane fluid and a siloxane hydride fluid, it has been found that the capsules often settle to the bottom of the one part heat curable organopolysiloxane mixture, or reduce the transparency of the curable mixture.

In copending application Ser. No. 07/424,022, now U.S. Pat. No. 5,025,073, one part heat curable organopolysiloxane compositions are described which utilize as a latent platinum catalyst, an inclusion compound of a cyclodextrin, such as a β-cyclodextrin, with a complex of a platinum halide and a diene, such as 1,5-cyclooctadiene (COD). Although valuable results can be obtained with the use of such inclusion compounds of a cyclodextrin and a platinum halide complex, one part silicone mixtures containing such inclusion compounds often suffer from the appearance of irregular black spots. In addition, the physical properties of one part RTV silicone compositions containing such cyclodextrin inclusion compounds are often inferior to the properties of the corresponding two part RTVs containing a soluble platinum catalyst.

It would be desirable, therefore, to develop one part heat curable organopolysiloxane compositions having satisfactory shelf stability which provide organopolysiloxanes substantially equivalent to 2 part heat curable RTVs when in the cured state.

SUMMARY OF THE INVENTION

The present invention is based on the discovery that one part heat curable organopolysiloxane compositions can be made by providing as a hydrosilylation catalyst, a latent platinum metal complex which is free of platinum halogen bonds. For example, there can be used, as the latent platinum catalyst, an inclusion compound of a cyclodextrin, such as β-cyclodextrin and a complex of platinum metal, or a $C_{(1-4)}$ alkyl substituted platinum metal in further combination with a complexing ligand, such as dicyclopentadiene, cyclooctatetraene, cyclopentadiene, a 1,5-cyclooctadiene or a norbornadiene.

STATEMENT OF THE INVENTION

There is provided by the present invention, one part heat curable organopolysiloxane compositions comprising by weight, (A) 100 parts of a vinyl substituted organopolysiloxane fluid, (B) 1 to 20 parts of a siloxane hydride and, (C) an effective amount of an inclusion compound of a cyclodextrin and a complex of a ligand and a platinum metal material free of platinum-halogen bonds, which complex has the formula, $$R\,Pt(R^1)_a, \tag{1}$$

where R is an organic cyclic group which is chemically combined to platinum and has at least 4 carbon atoms and 2 sites of aliphatic unsaturation, $R^1$ is selected from the same or different $C_{(1-4)}$ alkyl radicals chemically combined to platinum, and a is a whole number equal to 0 to 3 inclusive.

The platinum metal complexes which can be employed to form inclusion compounds with cyclodextrin, which hereinafter means β-cyclodextrin, α-cyclodextrin, or γ-cyclodextrin, can be made by various procedures. A typical procedure which can be used is incorporated herein by reference from H. C. Clark, L. E. Manzer, Organomet. Chem. 59 (1973) 411 and is as follows, where "COD" is 1,5-cyclooctadiene:

(i) Pt(COD)I$_2$

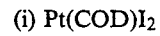

To a solution of K$_2$PtCl$_4$(10 g) in 160 ml of distilled water was added 110 ml of n-propanol, 20 ml of 1,5-cyclooctadiene and 0.150 g of SnCl$_2$. The mixture was magnetically stirred for two days (or until the solution was nearly colorless), during which time a white precipitate formed. The mixture was filtered, washed with distilled water (100 ml) and 20 ml of ethanol, then air-dried. The yield of PtCl$_2$(COD) was usually better than 8.8 g (98%). The dichloride was readily converted to the diiodide in 98% yield by the addition of a slight excess of NaI (7 g) to 8.2 g of PtCl$_2$(COD) as a suspension in acetone. The solution immediately turned yellow and the acetone was removed by rotary evaporation. The residue was collected on a frit and washed three times with 50 ml portions of distilled water and air-dried.

(ii) Pt(CH$_3$)$_2$(COD)

To an ice-cold solution of 11.8 g of Pt(COD)I$_2$ in 100 ml of diethylether under nitrogen was added a slight excess of methyllithium (30 ml of a 1.95M solution in ether). The solution was stirred for two hours and hydrolyzed at 0° with an ice-cold saturated aqueous solution of ammonium chloride. The ether layer was separated and the aqueous layer extracted with three 50 ml portions of diethyl ether. The ether fractions were dried over anhydrous magnesium sulphate containing a small amount of activated charcoal. The solution was filtered and the ether removed by rotary evaporation to give white crystals of Pt(CH$_3$)$_2$(COD) (6.05 g, 87%).

Additional procedures are shown by Z. Xue, J. Strouse, D. K. Shuh, C. B. Knobler, H. D. Kaesz, R. F. Hicks, R. S. Williams, J. Am. Chem. Soc., 111 (1989) 8779, and J. Chatt, L. M. Venazzi, J. Chem. Soc. (1957) 4735. In accordance with the aforementioned methods, complexes can be made by effecting reaction between 1,5-cyclooctadiene with dimethyl platinum, or reaction between cyclopentadiene and trimethyl platinum.

Inclusion compounds of the above complexes of the platinum metal material of formula (1) and cyclodextrin can be made in accordance with the procedure shown by Akira Harada et al, Journal of the Chemical Society, Chemical Communications, #16 (1986), pages 1229–1230.

The vinyl-substituted organopolysiloxane fluid, hereinafter referred to as the "vinylsiloxane" utilized in the one part heat curable organopolysiloxane compositions of the present invention can have a viscosity of from about 100 to 200,000 centipoises. Although vinyl substitution can be on the polysiloxane backbone, a preferred vinylsiloxane is included within the following formula:

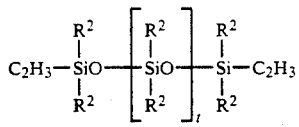

where C$_2$H$_3$ is vinyl, R$^2$ is selected from C$_{(1-13)}$ monovalent organic radicals free of olefinic unsaturation, and t is a positive integer having a value sufficient to provide a vinylsiloxane viscosity of from about 100 to 200,000 centipoises at 25° C. Preferably, R$^2$ is selected from alkyl radicals of 1 to 8 carbon atoms, such as methyl, ethyl, propyl; monovalent aryl radicals such as phenyl, methylphenyl, ethylphenyl; cycloalkyl radicals, cycloheptyl and haloalkyl radicals such as 3,3,3-trifluoropropyl. Preferably, the vinylsiloxane has terminal units of the formula,

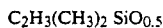

which can vary from about 0.05 to about 3.5 mole percent, based on the total chemically combined siloxy units and preferably from 0.14 to about 2 mole percent.

The vinylsiloxane of Formula (2) can be prepared by equilibrating cyclotetrasiloxane with a vinyl terminated low molecular weight polysiloxane chainstopper. However, if vinyl organosiloxy units are desired in the backbone, a predetermined amount of cyclic vinylorganosiloxane can be used in the equilibration mixture. The chainstopper is preferably a low molecular weight vinyl terminated organopolysiloxane, such as the corresponding disiloxane, trisiloxane or tetrasiloxane. These low molecular weight vinyl terminated polysiloxane polymers are produced by hydrolyzing the appropriate chlorosilanes particularly vinyldiorganochlorosilane along with diorganodichlorosilane to produce the desired vinyl chainstopped polydiorganosiloxanes. The equilibration catalyst which can be used is preferably an acid catalyst such as toluenesulfonic acid, or an acid treated clay. An alkali metal hydroxide such as potassium or sodium hydroxide, also can be used as the equilibration catalyst. When the equilibration has proceeded to the point where about 85% of the cyclopolysiloxane has been converted to linear polymer, the acid catalyst can be neutralized or filtered out. Preferably, excess cyclics are stripped off so that the linear polymer will have a low volatile content.

Included within the siloxane hydride is a "coupler", having the formula,

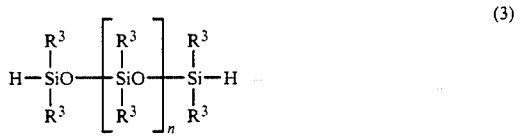

where R$^3$ is selected from C$_{(1-13)}$ monovalent organic radicals free of olefinic unsaturation and n is an integer having a value sufficient to provide the "coupler" with a viscosity of 1 to 500 centipoises at 25° C and from about 3 to 9 mole percent of chainstopping diorganohydride siloxy units, based on the total moles of chemically combined siloxy units in the siloxane hydride.

In addition to the coupler of formula (3), the siloxane hydride used in the heat curable polysiloxane compositions of the present invention also can include siloxane hydride resins consisting essentially of the following chainstopping unit,

condensed with silicate (SiO$_2$) units, where R$^3$ is as previously defined and the R$^3$+H to Si ratio can vary from 1.0 to 2.7. A discussion of silicone resins is shown in Rochow Chemistry of the Silicones, pp. 90-94, Second Edition, John Wiley and Sons, New York, 1951, which is incorporated herein by reference. Siloxane hydride resins also can have the above condensed chainstopping units chemically combined with SiO$_2$ units and (R$^3$)$_2$SiO units, where the R$^3$+H to Si ratio can vary from 1.2 to 2.7.

The siloxane hydride resins can be made by hydrolyzing the corresponding hydride chlorosilanes in the presence of an organic hydrocarbon solvent. To prepare resins having only monofunctional (R$^3$)$_3$SiO$_{0.5}$ units and tetrafunctional SiO$_2$ units, there can be cohydrolyzed a hydrogen diorganochlorosilane and tetrachlorosilane.

Resins having monofunctional siloxy units, difunctional siloxy units, and tetrafunctional siloxy units, can be obtained by hydrolyzing a hydrogendiorganochlorosilane, tetrachlorosilane and a diorganodichlorosilane at particular ratios. Additional siloxane hydride resins are shown by Jeram, U.S. Pat. No. 4,040,101 which is incorporated herein by reference.

The siloxane hydride also can be linear organopolysiloxane having the formula,

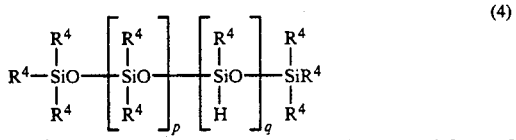 (4)

where $R^4$ is a $C_{(1-13)}$ monovalent organic radical free of olefinic unsaturation, and p and q are integers having values sufficient to provide a polymer having a viscosity of from 1 to 1,000 centipoises at 25° C, and wherein the polysiloxane has from 0.04% to 1.4% by weight of hydrogen. The siloxane hydride of formula (4) can be produced by equilibrating the appropriate hydrogencyclopolysiloxane with the appropriate cyclopolysiloxane containing $R^4$ substituent groups, in combination with low molecular weight linear triorganosiloxane chainstoppers.

In formulas (3) and (4), $R^3$ and $R^4$ radicals can be the same or different and are selected from alkyl radicals having from 1 to 8 carbon atoms, such as methyl, ethyl, propyl, etc.; cycloalkyl radicals such as cyclohexyl, cycloheptyl, etc.; aryl radicals such as phenyl, tolyl, xylyl, etc.; and haloalkyl radicals such as 3,3,3-trifluoropropyl.

The siloxane hydride of formula (4) is prepared by either a hydrolysis process or by an acid catalyzed equilibration process. In the equilibration process, cyclopolysiloxane is equilibrated with a low molecular weight hydrogen terminated chainstopper, such as a dihydrogentetraorganodisiloxane. The acid catalyzed equilibration reaction is silimar to the method used for the production of the vinyl containing base polymer. In the hydrolysis process, hydrogendiorganochlorosilane is hydrolyzed with diorganodichlorosilanes to produce the polymer of formula (4). The resulting siloxane hydride can be separated from undesirable cyclics by stripping.

The inclusion compound used as the platinum group metal catalyst in the practice of the present invention can be in the form of an inclusion compound of cyclodextrin, such as β-cyclodextrin, α-cyclodextrin or γ-cyclodextrin and a platinum metal complex of dicyclopentadiene, cyclopentadiene, cyclooctatetraene, 1,5-cyclooctadiene or norbornadiene as previously defined. The inclusion compound can be made in accordance with the procedure of Akira Harada et al as previously cited, which is incorporated herein by reference. For example, an inclusion compound of the diene platinum complex and the cyclodextrin can be prepared by adding fine crystals of the diene platinum complex to a saturated aqueous solution of the cyclodextrin at 40° C. The product which precipitates can be washed with water to remove the remaining cyclodextrin and dried in vacuo. Non-included platinum complex can be removed by washing the residue with methylene chloride and the product recrystallized from water or aqueous ethanol. The diene platinum complex can be made in accordance with the procedure of H. C. Clark et al, Journal of Organometallic Chemistry, 59 (1973), 411–428, pp. 411–423 and particularly pages 411, 421, 423, which is incorporated herein by reference.

An effective amount of the platinum group catalyst of the present invention is that amount of inclusion compound which is sufficient to provide from 5 ppm to 200 ppm of platinum based on the weight of heat curable organopolysiloxane compound composition, and preferably from 10 ppm to 100 ppm.

There can be incorporated in the heat curable organopolysiloxane compositions of the present invention, from 5 to 100 parts by weight of a filler per 100 parts by weight of the vinyl siloxane. The filler can be selected from fumed silica, precipitated silica and mixtures thereof. Preferably, less than 50 parts by weight of filler per 100 parts by weight of the vinylsiloxane is utilized. In addition to the reinforcing filler, such as fumed silica and precipitated silicas, there may be utilized extending fillers. The reinforcing and extending fillers are for instance, titanium dioxide, zinc oxide, zirconium silicate, silica aerogel, iron oxide, diatomaceous earth, calcium carbonate, silazane treated silicas, glass fibers, magnesium oxide, chromic oxide, zirconium oxide, aluminum oxide, alpha quartz, calcined clay, carbon, graphite, cotton, and synthetic fibers.

For liquid injection molding applications, it has been found desirable to limit the viscosity below 500,000 centipoises at 25° C and more preferably, below 200,000 centipoises at 25° C.

Cure of the heat curable compositions of the present invention, can be achieved at temperatures of from 100° C to 200° C and preferably 135° C to 150° C.

In order that those skilled in the art will be better able to practice the present invention, the following examples are given by way of illustration and not by way of limitation. All parts are by weight.

EXAMPLE 1

1,5-cyclooctadiene dimethyl platinum was prepared in accordance with the procedure of H. C. Clark, and L. E. Manzer, J. Organomet. Chem. 59 (1973) 411. There was added, 0.29 gram of the 1,5-cyclooctadiene dimethyl platinum complex to one gram of β-cyclodextrin in the form of a hot stirring aqueous solution in 20 mL of water. A white precipitate formed and the mixture was heated for 1.5 hours, stirring at 50° C. The mixture was filtered and the white solid which was collected was washed with 200 mL of water and then placed in a Soxhlet extraction thimble. The solid was extracted for 17 hours with methylene chloride.

The $^1H$ NMR spectrum of the 1,5-cyclooctadiene dimethyl platinum complex (CODPtMe$_2$) showed resonances at δ 0.733, 2.33 and 4.81 ppm due to CH$_3$, CH$_2$ and CH respectively. The inclusion compound of the CODPtMe$_2$ with β-cyclodextrin (CODPtMe$_2$/β-CD) shows resonances of 0.55, 2.24 and 4.80 consistent with complex formation. Furthermore, X-ray powder diffraction patterns of pure β-CD, CODPtMe$_2$ and CODPtMe$_2$/β-CD 0 showed that CODPtMe$_2$/β-CD was a compound and not a mixture.

EXAMPLE 2

Methyl platinum complexes with cyclopentadiene and methylcyclopentadiene were prepared in accordance with the procedures of Z. Xue, J. Strouse, D. K. Shuh, C. B. Knobler, H. D. Kaesz, R. F. Hicks, R. S. Williams, J. Am Chem. Soc., 111 (1989) 8779 and J.

Chatt, L. M. Vanazzi, J. Chem. Soc. (1957) 4735 as follows:

Freshly cracked $C_5H_6$ (distilled from dicyclopentadiene, $C_{10}H_{12}$) (1 mL, 2 mmol) was added to 25 mL of THF (freshly distilled from Na benzophenone ketyl) in a 3 neck 250 mL flask equipped with a nitrogen inlet and reflux condenser. To the flask was added Na (0.32 g, 13.9 mmol). The mixture was stirred; the solution turned yellow and then red $[Me_3PtI]_4$ (2g, 5.45 mmol) was placed in a Schlenk tube under a nitrogen atmosphere and combined with the $NaC_5H_5$/THF solution. The mixture was stirred under nitrogen for 17h. The mixture was then filtered and washed with $CH_2Cl_2$. All the $CH_2Cl_2$ extracts were taken to dryness under vacuum and then the product was sublimed at 0.7 mm, ambient temperature to give 0.86g (51% yield) white crystals. The products $^1H$ NMR agreed with that reported for $CpPtMe_3$, where Cp is cyclopentadienyl and Me is methyl.

Na sand was prepared by refluxing Na (0.35g) in ca. 50 mL xylene and then pipetting off the xylene and replacing it with freshly distilled THF. The methylcyclopentadienyl (MeCp) dimer was distilled to crack it into methylcyclopentadiene. The methylcyclopentadiene (1 mL) was added to the Na sand/THF mixture and stirred to make the NaMeCp. The NaMeCp THF solution was added by pipet to a 50 mL Schlenk tube containing $[Me_3PtI]_4$ (2g) under nitrogen, leaving the excess Na behind. The solution was stirred at ambient temperature for 4 hours after which time it turned dark. The solvents were removed under vacuum and the product was sublimed at 0.7 mm, ambient temperature to give 1.49g of white crystals (83% yield). The $^1H$ NMR of the product matched that for $MeCpPtMe_3$ where MeCp=methylcyclopentadienyl. Additional platinum complexes were prepared following the above procedure. These complexes were then contacted with β-cyclodextrin in accordance with the procedure of Example 1 to determine whether inclusion compounds could be made. The following results were obtained:

| Metal Compound | Inclusion Compound Formed |
|---|---|
| $Pt_2Dba_3$ | No |
| $(PhCN)_2PtCl_2$ | No |
| $CODPtPh_2$ | No |
| $CODPtMe_2$ | Yes |
| $CpPtMe_3$ | Yes |
| $MeCpPtMe_3$ | Yes | where
MeCp=methylcyclopentadienyl
Dba=dibenzylidene acetone
Cp=cyclopentadienyl
COD=1,5-cyclooctadiene
Me=methyl
Ph=phenyl The above results show that $CODPtMe_2$, $CpPtMe_3$ and $MeCpPtMe_3$ form inclusion compounds with β-cyclodextrin.

The various β-cyclodextrin inclusion compound of the platinum metal complexes were analyzed and the following results were obtained,

| Inclusion Compound | % Metal (Analysis) |
|---|---|
| $CODPtMe_2$/BCD | 6.55 |
| $CpPtMe_3$/BCD | 12.5 |

| Inclusion Compound | % Metal (Analysis) |
|---|---|
| $MeCpPtMe_3$/BCD | 7.53 |

In addition to the metal analysis, the identity of the above inclusion compounds were also confirmed by X-ray powder diffraction and $^1H$ NMR.

EXAMPLE 3

A silicone base formulation was prepared by adding 1.25 grams of a polydimethylpolymethylhydrogen silicone copolymer having a viscosity of 50-150 centipoise and 0.8 weight % hydrogen to 50 grams of a vinyl terminated polydimethylsiloxane having a viscosity of 4,000 centipoise containing 100 ppm of platinum in the form of one of the complexes shown in Example 2. It was found that the resulting RTV cured within 1 hour at ambient temperature. These results showed that when utilized as a platinum complex instead of an inclusion compound with β-cyclodextrin, the platinum complex was useful as platinum catalyst for a two part heat curable silicone composition.

Several platinum complexes were then reacted with β-cyclodextrin to produce the corresponding inclusion compounds. One part RTV mixtures were prepared with these inclusion compounds. The one part RTV mixtures were evaluated using the above silicone base formulation at 150° C., and at a temperature of 50° C. to determine ambient shelf stability under accelerated conditions. The following results were obtained:

| Inclusion Compound/β-CD | 150° C. Gel Time (Min) | Minimum 50° C. Bath Life (Days) |
|---|---|---|
| $CODPtMe_2$ (25 ppm Pt) | 5 | >57 |
| $CpPtMe_3$ (25 ppm Pt) | 68 | >71 |
| $MeCpPtMe_3$ (25 ppm Pt) | 3 | gelled (2) |

In view of shorter gel times at 150° C., the β-cyclodextrin complexes of 1,5-cyclooctadiene dimethyl platinum and methylcyclopentadienyl platinum trimethyl were found to be superior as latent catalysts to the β-cyclodextrin complex of cyclopentadienyl platinum trimethyl.

EXAMPLE 4

A silicone base formulation was prepared consisting of 100 parts of a vinyl terminated polydimethylsiloxane fluid having a viscosity of 40,000 centipoise, 27 parts of fumed silica treated in-situ with excess silanol stopped polydimethyl silicone fluid having a 7% by weight of silanol and an average of less than about 10 dimethylsiloxy units, 2.1 part of a silicone resin having a viscosity of 20 centipoise and consisting essentially of dimethylhydrogensiloxy units and having 0.9 weight % hydrogen and 0.7 part of a silicone copolymer having a viscosity of 50-150 centipoise and 0.8 weight % hydrogen and consisting of dimethylsiloxy units and methylhydrogensiloxy units.

Various curable one part silicone compositions were prepared by incorporating effective amounts of the β-cyclodextrin inclusion compounds of the platinum metal complexes of Example 3 utilizing a Baker-Perkins double planetary mixer. The heat curable platinum catalyzed silicone formulations were cured for 1 hour at 150° C. A platinum catalyzed heat curable silicone composition also was prepared as a control using 25 ppm of platinum as a complex with vinyl disiloxane, as shown by Karstedt, U.S. Pat. No. 3,775,452. The following results were obtained:

| Catalyst (ppm metal) | Shore A Hardness | Tensile Strength (psi) | Elongation (%) |
|---|---|---|---|
| Control (25) | 48 | 1120 | 530 |
| CODPtCl$_2$/β-CD (25)* | 34 | 570 | 510 |
| CODPtCl$_2$/β-CD (100)* | 38 | 740 | 520 |
| CpPtMe$_3$/β-CD (25) | 33 | 713 | 627 |
| CODPtMe$_2$/β-CD (25) | 48 | 943 | 492 |

*Cured samples had black spots throughout sample

The above results show that the platinum complexes made in accordance with the present invention, namely CODPtMe$_2$/β-CD, exhibit superior properties approaching that of the control, while providing long term shelf stability at 50° C. (>2 weeks). In addition, complexes prepared from CODPtCl$_2$ resulted in silicone materials with black spots.

Although the above results are directed to only a few of the very many variables which can be used in the practice of the present invention, it should be understood that the present invention is directed to the use of a much broader variety of silicone RTVs utilizing various components in the base silicone formulation, as well as inclusion compounds of platinum metal complexes and cyclodextrin useful for catalyzing such silicone mixtures.

What is claimed is:

1. A one part heat curable organopolysiloxane composition comprising by weight,
    (A) 100 parts of a vinyl substituted organopolysiloxane fluid,
    (B) 1 to 20 parts of a siloxane hydride and,
    (C) an effective amount of an inclusion compound of a cyclodextrin and a complex of a ligand and a platinum metal material free of platinum-halogen bonds, which complex has the formula, R Pt(R$^1$)$_a$, where R is an organic cyclic group which is chemically combined to platinum and has at least 4 carbon atoms and 2 sites of aliphatic unsaturation, R$^1$ is selected from the same or different C$_{(1-4)}$ alkyl radicals chemically combined to platinum, and a is a whole number equal to 0 to 3 inclusive.

2. A one part heat curable organopolysiloxane composition in accordance with claim 1, where the platinum metal material is platinum metal.

3. A one part heat curable organopolysiloxane composition in accordance with claim 1, where the platinum metal material is a C$_{(1-4)}$ alkyl substituted platinum.

4. A one part heat curable organopolysiloxane composition in accordance with claim 1, where the vinyl substituted organopolysiloxane fluid is a vinyl substituted polydimethylsiloxane fluid.

5. A one part heat curable organopolysiloxane composition in accordance with claim 1, where the siloxane hydride is a methylsiloxane hydride fluid.

6. A one part heat curable organopolysiloxane in accordance with claim 1, which is reinforced with a filler.

7. A one part heat curable organopolysiloxane composition in accordance with claim 1, where the cyclodextrin is β-cyclodextrin.

8. A one part heat curable organopolysiloxane composition in accordance with claim 1, where the platinum metal material is a dimethyl platinum.

9. A one part heat curable organopolysiloxane composition comprising by weight,
    (A) 100 parts of a vinyl substituted organopolysiloxane fluid,
    (B) 1 to 20 parts of a siloxane hydride and,
    (C) an effective amount of an inclusion compound of a cyclodextrin and a complex of a ligand and a platinum metal material free of platinum-halogen bonds, which complex has the formula, R Pt(R$^1$)$_a$, where R is an organic cyclic group which is chemically combined to platinum and is a ligand selected from the class consisting of dicyclopentadiene, cyclooctatetraene, cyclopentadiene, 1,5-cyclooctadiene and norbornadiene, R$^1$ is selected from the same or different C$_{(1-4)}$ alkyl radicals chemically combined to platinum, and a is a whole number equal to 0 to 3 inclusive.

* * * * *